(12) United States Patent  
Kaestner (10) Patent No.: US 8,458,991 B2  
(45) Date of Patent: Jun. 11, 2013

(54) WRAPPING DEVICE WITH A ROD-SHAPED WRAPPING ELEMENT

(75) Inventor: Florian Kaestner, Rosenheim (DE)

(73) Assignee: Krones AG, Neutraubling (DE)

( * ) Notice: Subject to any disclaimer, the term of this patent is extended or adjusted under 35 U.S.C. 154(b) by 167 days.

(21) Appl. No.: 13/068,484

(22) Filed: May 12, 2011

(65) Prior Publication Data

US 2011/0283659 A1 Nov. 24, 2011

(30) Foreign Application Priority Data

May 20, 2010 (DE) .................... 20 2010 007 012 U (51) Int. Cl.
*B65B 11/00* (2006.01)

(52) U.S. Cl.
USPC .............................. 53/203; 53/210

(58) Field of Classification Search
USPC .................... 53/203, 210, 465, 589
See application file for complete search history.

(56) References Cited

U.S. PATENT DOCUMENTS

| 1,511,221 | A | * | 10/1924 | Joy | 198/728 |
| 1,686,567 | A | * | 10/1928 | Levin | 198/732 |
| 2,100,959 | A | | 7/1935 | Hurxthal | 34/20 |
| 2,575,610 | A | | 12/1947 | Ball et al. | 198/175 |
| 2,443,010 | A | | 6/1948 | Petskeyes | 198/732 |
| 2,756,868 | A | * | 7/1956 | Russell | 198/731 |
| 2,756,869 | A | * | 7/1956 | Merck et al. | 198/731 |
| 2,761,548 | A | * | 9/1956 | Long | 198/733 |
| 2,865,492 | A | * | 12/1958 | Bigler et al. | 198/733 |
| 2,882,665 | A | * | 4/1959 | Cross | 53/233 |
| 3,089,579 | A | * | 5/1963 | Beck | 198/731 |
| 3,103,275 | A | * | 9/1963 | Rollins | 198/733 |
| 3,791,100 | A | * | 2/1974 | Monaghan | 53/74 |
| 3,961,702 | A | | 6/1976 | Blok | 198/175 |
| 4,083,163 | A | * | 4/1978 | Ganz | 53/48.2 |
| 4,388,990 | A | * | 6/1983 | Michalik | 198/867.15 |
| 4,663,914 | A | | 5/1987 | Ganz | 53/398 |
| 5,203,144 | A | * | 4/1993 | Gambetti | 53/465 |
| 5,203,146 | A | * | 4/1993 | Gambetti | 53/557 |
| 5,463,846 | A | * | 11/1995 | Gambetti | 53/465 |
| 6,128,888 | A | * | 10/2000 | Gambetti | 53/465 |
| 6,571,936 | B1 | * | 6/2003 | Melhuish et al. | 198/731 |
| 6,817,159 | B2 | * | 11/2004 | Sakaki et al. | 53/399 |
| 6,848,239 | B2 | * | 2/2005 | Shibazaki et al. | 53/399 |

(Continued)

FOREIGN PATENT DOCUMENTS

| CA | 1340161 | 12/1998 |
| CN | 101035710 A | 9/2007 |

(Continued)

*Primary Examiner* — M. Alexandra Elve  
*Assistant Examiner* — Eyamindae Jallow  
(74) *Attorney, Agent, or Firm* — Davidson, Davidson & Kappel, LLC (57) ABSTRACT

A wrapping device (10) for an apparatus (1) for enveloping and packaging a group (3) of articles (2) while they are being moved on a conveyor device (6) with a web-shaped material (4). The wrapping device (10) includes a rod-shaped wrapping element (14), which is laterally fixed to two parallely disposed circulating traction elements (12) on both sides of the conveyor device, whereby said wrapping element (14) is moved by these traction elements (12). The wrapping element (14) is further fixable largely form-lockingly and without play in corresponding receiving elements (16, 48) of the respective traction elements (12), whereby at least one of the receiving elements (16, 48) includes a securing element (20) that can be moved against the return force of a spring locking device (18).

10 Claims, 9 Drawing Sheets

U.S. PATENT DOCUMENTS

| | | | |
|---|---|---|---|
| 6,874,302 B2 * | 4/2005 | Gambetti | 53/589 |
| 6,915,624 B2 * | 7/2005 | Shibazaki et al. | 53/588 |
| 6,964,147 B2 | 11/2005 | Gambetti | 53/465 |
| 7,328,554 B1 * | 2/2008 | Cerf | 53/465 |
| 2004/0040259 A1 * | 3/2004 | Sakaki et al. | 53/399 |
| 2004/0060267 A1 * | 4/2004 | Shibazaki et al. | 53/589 |
| 2005/0072123 A1 * | 4/2005 | Gambetti | 53/465 |
| 2006/0096249 A1 | 5/2006 | Duterte et al. | 53/442 |
| 2009/0301037 A1 | 12/2009 | Franzaroli et al. | |

FOREIGN PATENT DOCUMENTS

| | | |
|---|---|---|
| CN | 201102636 Y | 8/2008 |
| DE | 296 08 343 U1 | 9/1997 |
| DE | 100 37 714 C1 | 1/2002 |
| DE | 603 10 836 T2 | 8/2007 |
| DE | 20 2008 007 497 U1 | 8/2008 |
| EP | 0 229 452 A1 | 7/1987 |

* cited by examiner

WRAPPING DEVICE WITH A ROD-SHAPED WRAPPING ELEMENT

This claims the benefit of German Patent Application DE 20 2010 007 012, filed May 20, 2010 and hereby incorporated by reference herein.

The present invention relates to a wrapping device with a rod-shaped wrapping element.

BACKGROUND

After manufacture, beverage containers are usually assembled in bundles and, as the case may be, subsequently packaged, in particular shrink-wrapped with shrinking foils dispensed from supply rolls and wrapped around the bundles in a continuous process during the conveyance of said bundles, which are then exposed to heat in order to produce a tight wrapping.

Such a device for wrapping foil around a group of objects is known from DE 296 08 343 U1. The device allows several objects to be wrapped in succession, this being realized by arranging one or more foil take-up elements one after the other on a traction means.

DE 603 10 836 T2 and DE 20 2008 007 497 U1, for instance, disclose further packaging machines for enveloping objects with foil sections.

In this known process for packaging bundles, in particular in the production of packages referred to as "shrink packs", an exactly defined length of foil is wrapped around the bundle assembled for packaging. In this process, the wrapping direction of the foil corresponds to the moving direction of the machine. This single layer of wrapping is produced by means of a rod that circles the bundle while said bundle continues to be conveyed. In order to produce this circling movement, the rod is fastened to and guided by two parallel, synchronously moving chains. The currently known means for fastening the rods consist of a base support for the rods and a spring plate welded thereto. The sides that the rods are fastened to are differentiated on the basis of the machine's moving direction and the side from which the machine is operated. The two sides of the machine are accordingly classified as the so-called service side and the so-called operator side.

The foil wrapping rods on the service side are fastened, as a rule, by means of a base support disposed to be open in the direction of the chain axes. The foil rod is inserted into this opening and fixated or clamped over the spring plate by way of fastening. The foil wrapping rods on the operator side are fastened, as a rule, by means of a base support disposed to be open in the moving direction of the machine. The foil rod is pressed in between the spring plates by way of inserting it and thus at the same time fixated and clamped. Fastening of the wrapping rod support elements to the chain can be achieved, for instance, by fixing the support elements to the two hollow pin chains with dowel screws.

The foil wrapping rods can be constructed as follows. Thin sheets of metal are screwed onto both ends of a carbon fiber rod measuring approximately 20 mm in width and approximately 1000 mm in length. These sheets prevent the spring plate from milling into the rod and at the same time serve for monitoring the operating of the wrapping rods.

Several problems and disadvantages are associated with the current configuration and features. After a period of operation, the sheets of metal that are screwed onto the foil rod can, for instance, come loose. In addition, the spring plates are subject to gradual deformation at the wrapping rod support element. Furthermore, the rod material may erode, resulting in a loss of the fixation. Also, it is possible that the dowel screws for fastening the wrapping rod support elements to become deformed and damaged. The mentioned problems may cause disruptions to the manufacturing process or a collision with the bundles intended for packaging and, under unfavorable circumstances, damage to the machine.

Besides that, there are additionally the following economic disadvantages to be mentioned with regard to the prior art in fastening methods for the foil wrapping rods. For one, the welded construction of the rod support elements incurs relatively high costs. The hollow pin chain used here also causes more costs than a customary roller chain. In addition, the entire mounting assembly for the foil wrapping rod involves a considerable effort.

SUMMARY OF THE INVENTION

It is an object of the present invention to provide an improved wrapping device for an apparatus for enveloping and packaging a group of articles while they are moving on a conveyor device with a web-shaped material, whereby the wrapping rod is provided with a more reliable means of fastening and fixation that is wear-free even throughout the longer operating life.

The present invention provides a wrapping device for an apparatus for enveloping and packaging a group of articles while they are being moved on a conveyor device with a web-shaped material, whereby said wrapping device includes a rod-shaped wrapping element, which is laterally fixed to two parallely disposed circulating traction elements on both sides of the conveyor device, whereby said wrapping element is moved by these traction elements, and whereby this wrapping element is further fixable largely form-lockingly and without play in corresponding receiving elements of the respective traction elements, whereby at least one of the receiving elements includes a securing element that can be moved against the return force of a spring locking device. This first receiving element with the movable securing element may, in particular, include a U-shaped receiving pocket, the shape of which matches the profile of the wrapping element, so that it is possible to fixate said wrapping element reliably and, to a large extent, without play in the receiving pocket. This is achieved in that the U-shaped receiving pocket, which is open on one side, will be peripherally surrounded and closed when the securing element is locked in its securing position. With the securing element in its unsecured position, the U-shaped receiving pocket is open on one side for extracting the wrapping element in the defined direction in order to make it possible to extract and insert the rod. In order to be able to move the securing element between the two end positions mentioned above, the securing element can be slidable in a direction parallel to that of the longitudinal axis of the wrapping element between the spring-released securing position and the spring-loaded unsecured position along at least one guiding element and between two stops.

In a further preferred embodiment of the wrapping device according to the invention, it is intended for the second receiving element to include a receiving pocket that surrounds the wrapping element form-lockingly from all sides and fixates it. In this way, the wrapping element can be inserted in axial direction of the receiving pocket's opening into the second receiving element.

The wrapping element or the wrapping rod may, in particular, be of a flat shape with a rectangular profile and it may have rounded edges in each case. Steel or a composite material, for instance a carbon fiber composite material, are especially well-suited materials.

Furthermore, at least one of the receiving elements may be provided on one of its flat sides with a spring-loaded pressure piece for fixating, largely without play, the free end of the wrapping element being retained in the receiving element. It is possible for the pressure piece to be preferably clamped in between the flat side of the wrapping element and a cover plate that is detachably fixed to the receiving element.

In summary, the present invention can be characterized as follows. In the wrapping device according to the invention, the foil wrapping rod support element has been further developed and improved. Fastening of the foil wrapping rods is achieved on the service side by inserting the foil rod in the direction of the chain axes into a base support. Clamping of the rod is, however, not achieved as hitherto by a spring plate, but rather by an inserted pressure piece, to which a spring force is applied. It is now possible to omit the sheets of metal hitherto screwed onto the rod, as the said rod presses against the pressure piece and produces a counterforce. The spring force produces a surface pressure on the upper surface of the rod, thus causing the rod to remain fixed. Furthermore, this surface pressure can help to reduce swinging or vibrating of the rod. This in turn results in reducing erosion of the material of the foil rod. Moreover, the support is no longer screwed onto a hollow pin chain as it was previously, but rather inserted onto and fixed with a connecting link with extended bolts. The welded assembly necessary so far is disbanded and replaced by a lower-cost mounting assembly.

The fastening of the foil wrapping rods on the operator side has also been improved. The basic structure of the foil wrapping rod support element resembles that on the service side. The difference lies in the clamping system that is open in moving direction of the machine. An innovative and very reliably operating security closure or lock serves for securing the rod. For the purpose of fastening and unfastening the rod, respectively, this lock is manually pulled back, in the direction of the chain, so that it is possible to insert or extract the rod against the moving direction. The closing force of the securing system is further achieved by the spring force impact on the cylindrical pins.

The improved wrapping device was tested for its characteristics with regard to fastening and performance. Furthermore, the clamping force of the support element against the foil rod was in particularly tested. It turned out that the support element is significantly easier to handle. The improvements make it much easier and user-friendlier than previously to fasten and unfasten the foil rods. The now increased clamping force working on the rod allows for perfect insertion of the rod into the base body and for the rod to be fixed, to a large extent, without play. Over and above, the new system can be manufactured as well as assembled at a lower cost.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

DETAILED DESCRIPTION

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

Figure 1:
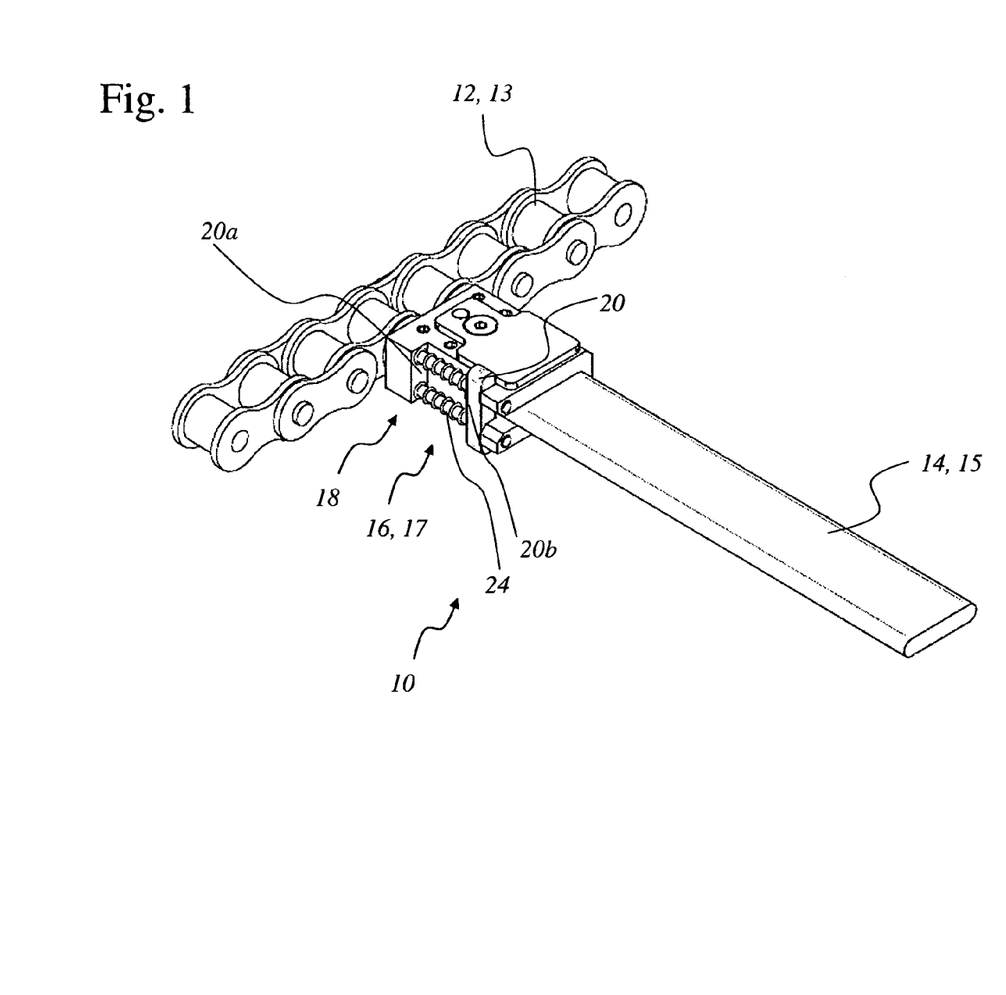
FIG. 1 shows a perspective partial view of an embodiment variant of a wrapping device according to the invention.
Figures 2A, 2B:
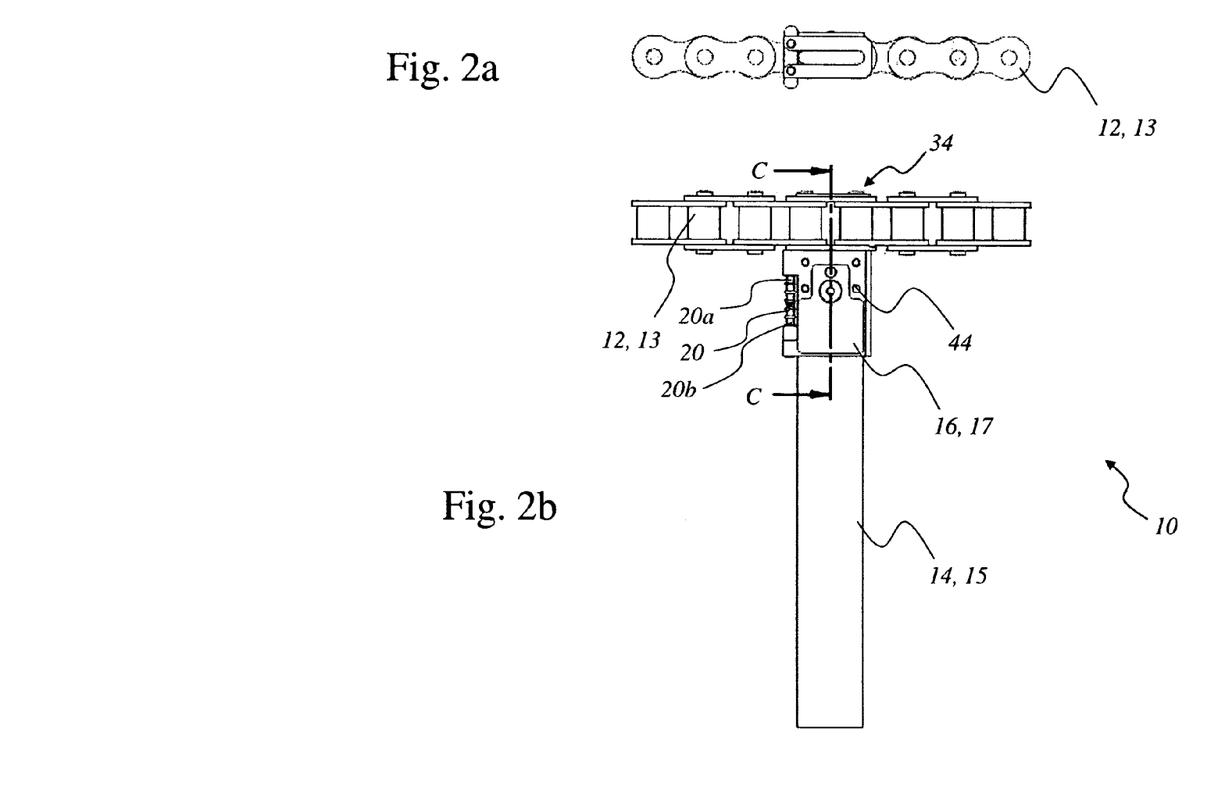
FIG. 2 shows a lateral view, a top view, and a slice view of a part of the wrapping device according to FIG. 1.
Figure 2C:
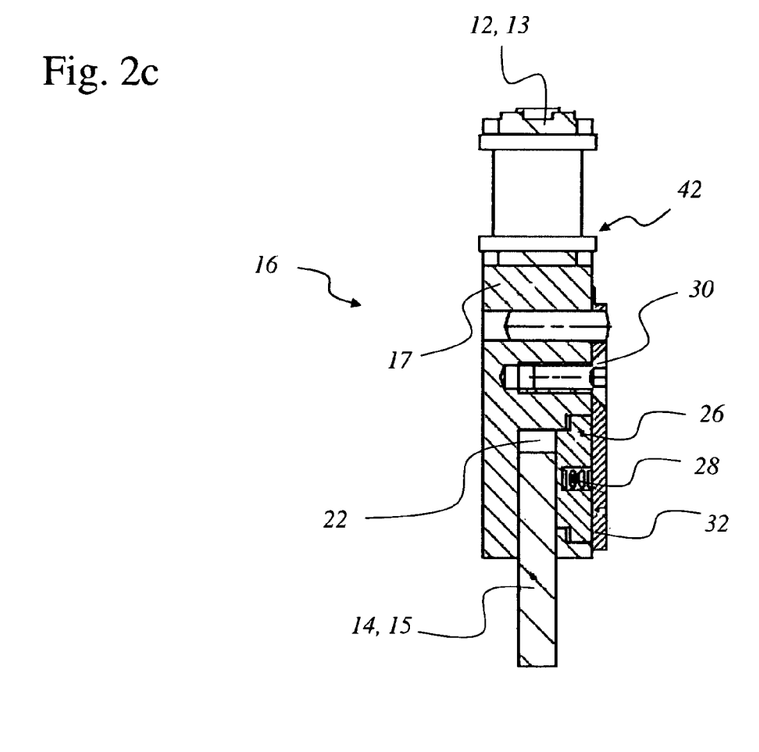
Figure 3:
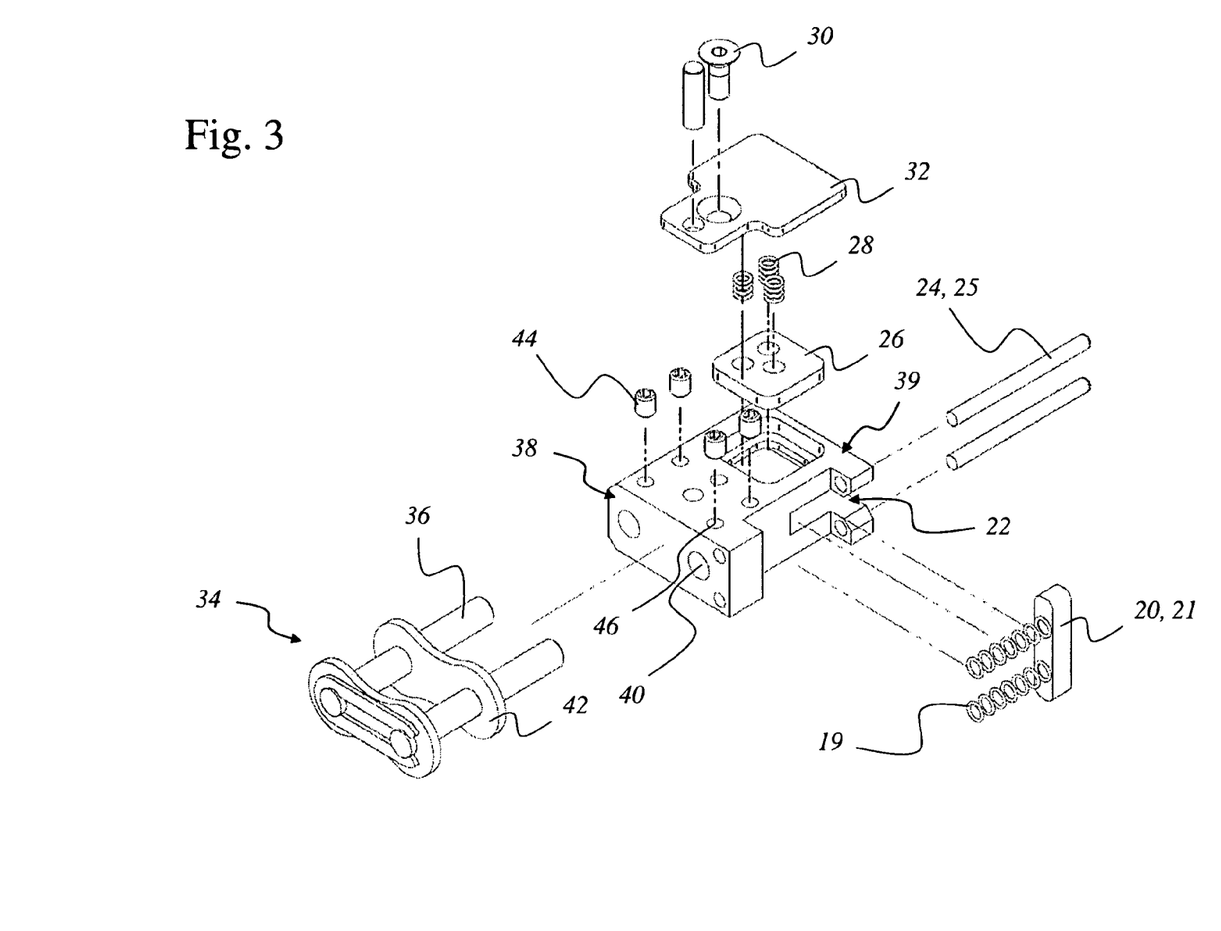
FIG. 3 shows a perspective explosion view of a part of the wrapping device according to FIG. 1.

The illustrations in FIGS. 1 to 3 show several views of an embodiment variant of a wrapping device according to the invention, in the present context in general designated with reference number 10. The wrapping device 10, which is partly presented here, is an essential component of an apparatus, not illustrated here, for enveloping and packaging a group of articles while they are being moved on a conveyor device with a web-shaped material, such as a shrinking foil. The wrapping device 10 includes a rod-shaped wrapping element 14, which may be a flat wrapping rod 15, which is laterally fastened onto two receiving elements 16. The two receiving elements 16 are disposed, each on one side, opposite each other on the circulating traction elements 12 on both sides of the conveyor device, thereby causing the wrapping element 14 to circulate as well. The rod-shaped wrapping element 14 is fixated without play and largely form-lockingly in the two corresponding receiving elements 16 of the respective traction elements 12. The receiving element 16 shown in the FIGS. 1 to 3 illustrates the so-called operator side of the wrapping device 10 and in this context includes a securing element 20, which can be moved against the return force of a spring locking device 18. The first receiving element 16 with the movable securing element 20 shown in different views in FIGS. 1 to 3 includes a U-shaped receiving pocket 22, the shape of which matches the profile of the wrapping element 14, so that it is possible to fixate said wrapping element 14 reliably and, to a large extent, without play in the receiving pocket 22. This is achieved in that the U-shaped receiving pocket 22, which is open on one side, will be peripherally surrounded and closed when the securing element 20 is locked in its securing position. With the securing element 20 in its unsecured position, the U-shaped receiving pocket 22 is open on one side for extracting the wrapping element 14 in the defined direction in order to make it possible to extract and insert the flat wrapping rod 15. In order to be able to move the securing element 20 between the two end positions mentioned above, the securing element 20 may be slidable in a direction parallel to that of the longitudinal axis of the wrapping element 14 between the spring-released securing position and the spring-loaded unsecured position along at least one guiding element 24 and between two stops 20a and 20b.

As can be seen in the FIGS. 1 to 6 illustrating an exemplary embodiment of the wrapping device according to the invention, the traction elements 12 is formed by a roller chain 13 as it is known, to which the receiving elements 16 are fastened. In the present context the receiving element 16 is also referred to as rod support element 17 because it is used for retaining the wrapping rod 15 and for anchoring it to the roller chain 13. Clamping of the rod 15 is achieved through an inserted pressure piece 26, which is braced against a screw 30-fastened cover plate 32 by a pressure spring 28, as can be seen in the slice view of FIG. 2c. It is now possible to omit the sheets of metal hitherto screwed onto the rod, as the said rod 15 presses against the inserted and braced pressure piece 26 and produces a counterforce. The spring force produces a surface pressure on the upper surface of the rod, thus causing the rod 15 to remain fixated in the receiving pocket 22 of the receiving element 16 or of the rod support element 17. Furthermore, this surface pressure helps to reduce swinging or vibrating of the rod 15, as the rod 15 is anchored largely without play.

The receiving element 16 or the rod support element 17 is screwed to the roller chain 13, as can be discerned from the perspective explosion view in FIG. 3. The roller chain 13 is provided with a connecting link 34 with extended bolts 36 for this purpose, whereby the rod support element 17 is inserted and fixated onto the said extended bolts. For this purpose the rod support element 17 is provided with two holes 40 on the rod support element's 17 front side 38 that is averted from the rod 15, whereby the said holes 40 are aligned with the extended bolts 36 so that the said holes 40 can receive the said bolts 36 until the rod support element's 17 front side 38 fits closely to the lug 42 of the connecting element 34. In this assembled position, the bolts 36 are fastened by four clamping screws 44, which are screwed into respective threaded holes 46 on the top side 39 of the rod support element 17, until they are in place against the outer sides of the bolts 36 and clamp these securely.

FIG. 3 furthermore illustrates the construction of the locking device 18 with the securing element 20, which are slideable on the guiding elements 24. These interacting components form the innovative and reliably operating security closure for the rod 15. For the purpose of fastening or unfastening the rod 15, this closure is manually operated by pulling back, in the direction of the chain 13, the plate 21 forming the securing element 20, against the return force of the two springs 19, which are guided on the guiding elements 24 or the pegs 25, so that it is possible to insert or extract the rod 15 against the moving direction. The closing force of the securing system or the locking device 18 is defined by the spring force of the two springs 19 that are guided on the pegs 25.

Figure 4:
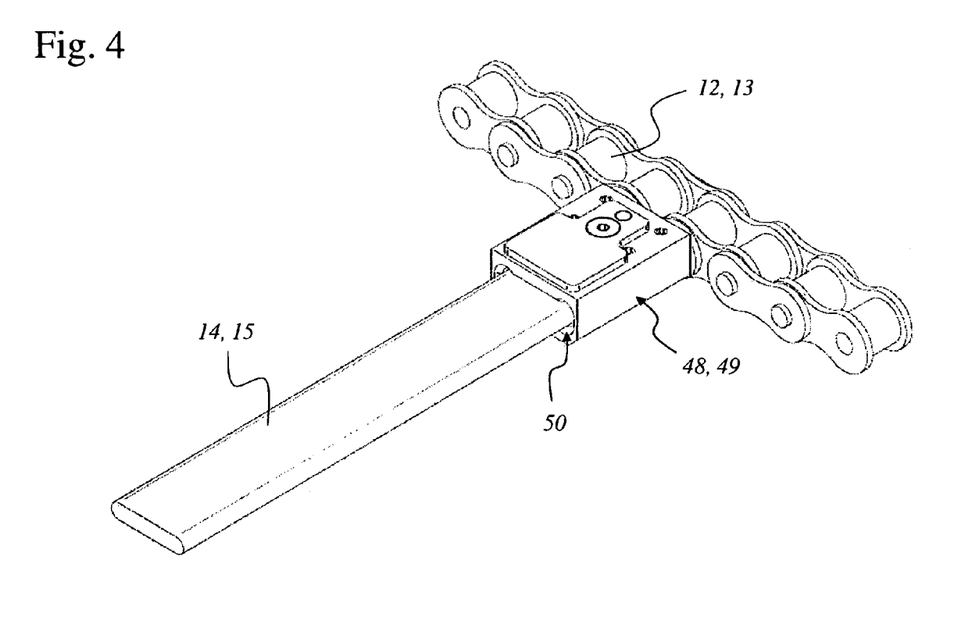
FIG. 4 shows another perspective partial view of an embodiment variant of the wrapping device according to the invention.
Figure 5A:
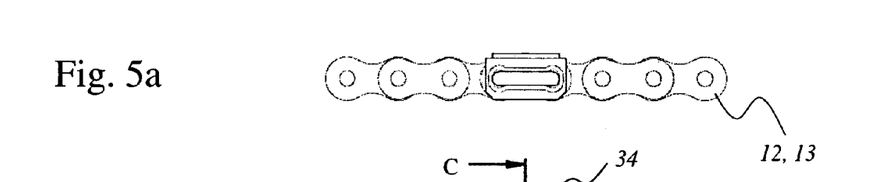
FIG. 5 shows a lateral view, a top view, and a slice view of a part of the wrapping device according to FIG. 4.
Figure 5B:
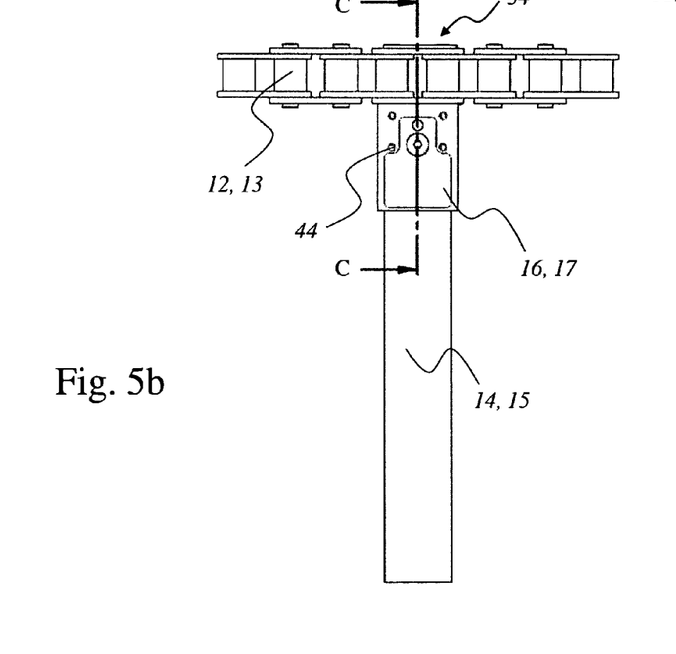
Figure 5C:
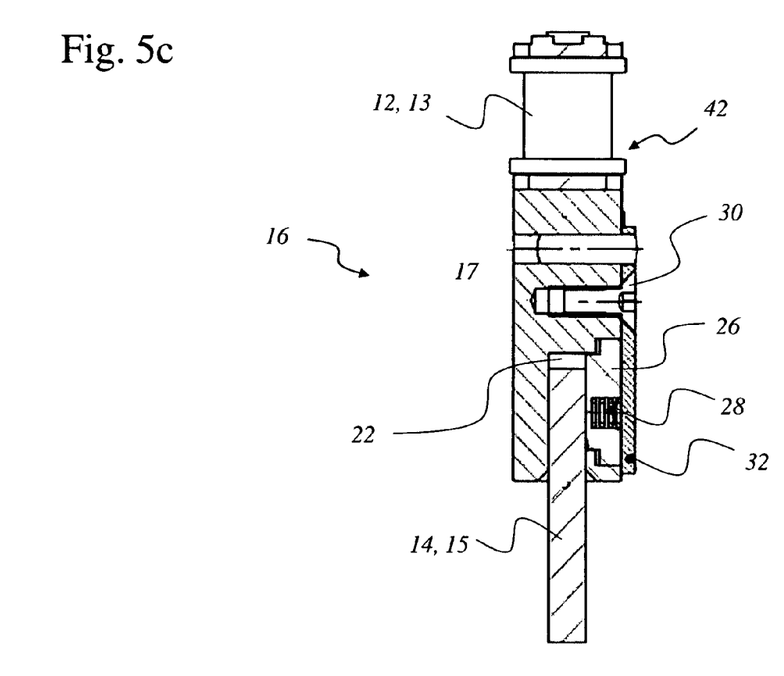
Figure 6:
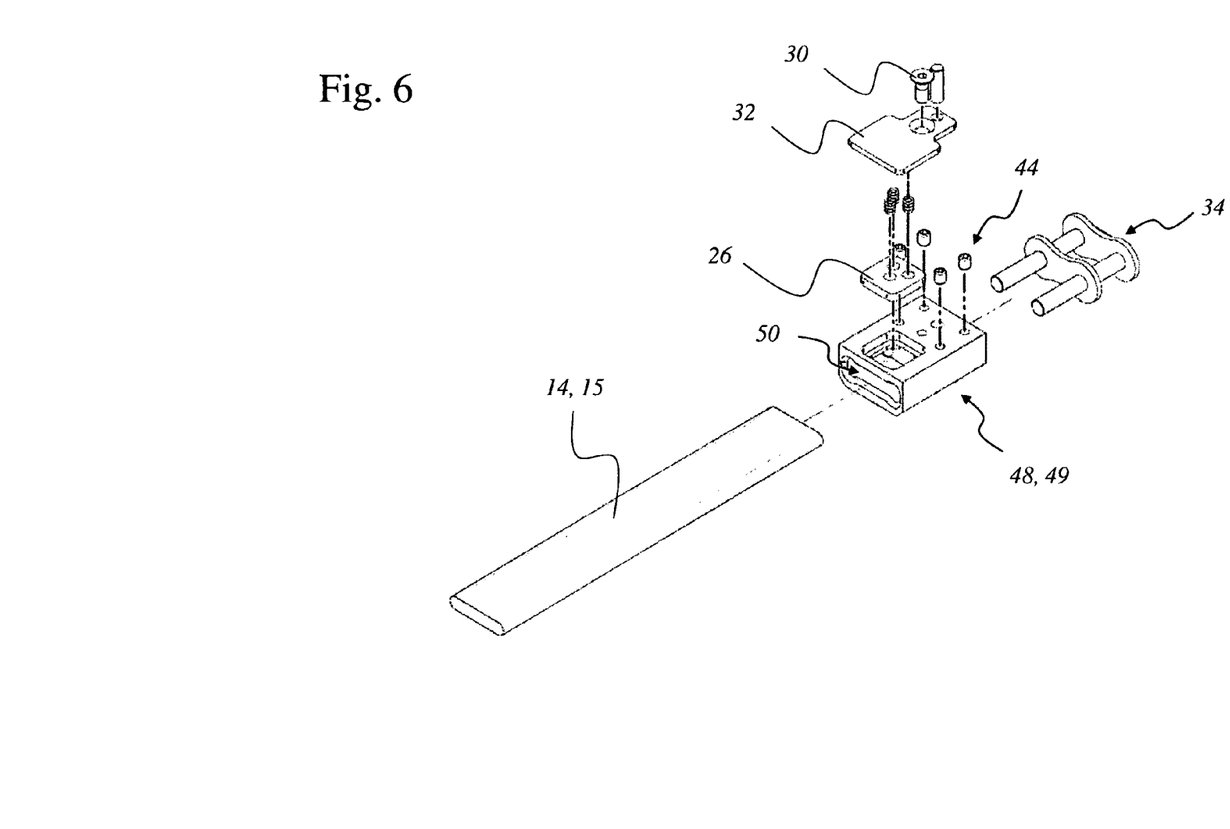
FIG. 6 shows a perspective explosion view of a part of the wrapping device according to FIG. 4.

As illustrated by the FIGS. 4 to 6, the second receiving element 48, here also referred to as second rod support element 49, which is disposed in alignment opposite the first receiving element 16, includes a receiving pocket 50, which surrounds the wrapping element 14 or the wrapping rod 15 form-lockingly from all sides and fixates it. In this way, the wrapping element 14 or the rod 15 can be inserted in axial direction of the receiving pocket's 50 opening into the second receiving element 48.

The rest of the construction of the receiving element 48 is indicated in the FIGS. 5a, 5b, 5c, and 6 and to the greatest possible extent corresponds to the design and construction of the first receiving element 16, also with regard to its mode of clamping and fastening to the roller chain. The essential difference lies in the peripherally closed shape of the second receiving pocket 50 of the second receiving element 48 or the rod support element 49 (cf. FIG. 6).

In the present context, the second receiving element 48 forms the so-called service side of the wrapping device 10. This means that for the purpose of mounting the rod 15 it is first inserted into the receiving pocket 50 on the service side (FIGS. 4 to 6) and subsequently inserted and fixated on the operator side by operating the locking device (FIGS. 1 to 3).

The wrapping element 14 or the wrapping rod 15 has a flat shape with a rectangular profile and in each case rounded edges. A carbon fiber composite material is particularly suitable, but also, for instance, steel or light metal.

Figure 7:
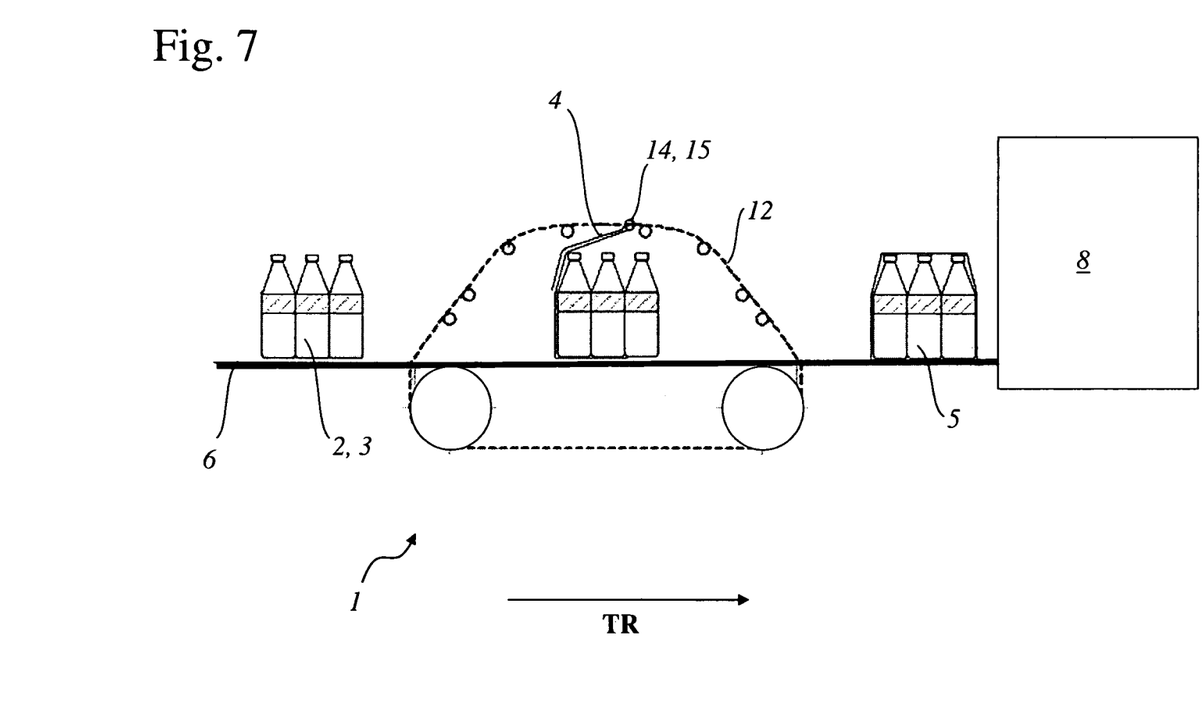
FIG. 7 shows a view of a device for wrapping and packaging articles.

FIG. 7 shows a device 1 for wrapping and packaging articles 2. Articles 2 are first grouped in a pre-defined composition and then transported to the device 1 by a conveyor, especially a conveying belt or the like. The device includes traction elements 12 guiding the wrapping element 14, e.g. the wrapping rod 15. The packaging material, especially plastic film 4 is guided by the wrapping rod 15 and is wrapped around the grouped articles 2, 3. The wrapped article group 5 is then moved along and transported to subsequent processing devices, e.g. a shrink tunnel or the like.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

List of Reference Characters
1 Device for wrapping and packaging
2 Articles
3 Group of articles
4 Packaging material/film
6 Conveying belt
8 Shrinking tunnel
10 Wrapping device
14 Wrapping element
15 Rod, wrapping rod
16 First receiving element
17 First rod support element
18 Locking device
19 Spring
20.Securing element
20a Stop
20b Stop
21 Plate
22 Receiving pocket
24 Guiding element
25 Peg
26 Pressure piece
28 Pressure spring
30 Screw
32 Cover plate
34 Connecting link
36 Extended bolt
38 Front side
39 Top side
40 Hole
42 Lug
44 Clamping screw
46 Threaded hole
48 Second receiving element
49 Second rod support element
50 Receiving pocket

What is claimed is:
1. Wrapping device for an apparatus for enveloping and packaging a group of articles while they are being moved on a conveyor device with a web-shaped material, whereby said wrapping device comprises
a rod-shaped wrapping element, which is laterally fixed to two parallely disposed circulating traction means on both sides of the conveyor device, whereby said wrapping element is moved by these traction means and whereby this wrapping element is further fixable largely form-lockingly and without play in corresponding receiving elements of the respective traction means, whereby at least one of the receiving elements comprises a securing element that can be moved against the return force of a spring locking device.

2. Wrapping device according to claim 1, whereby the first receiving element with the movable securing element comprises a U-shaped receiving pocket, the shape of which matches the profile of the wrapping element.

3. Wrapping device according to claim 2, whereby the U-shaped receiving pocket, which is open on one side, will be peripherally surrounded and closed when the securing element is locked in its securing position.

4. Wrapping device according to claim 2, whereby the securing element in its unsecured position causes the U-shaped receiving pocket to be open on one side for extracting the wrapping element in the defined direction.

5. Wrapping device according to claim 1, whereby the securing element is slidable in a direction parallel to that of the longitudinal axis of the wrapping element between the spring-released securing position and the spring-loaded unsecured position along at least one guiding element and between two stops.

6. Wrapping device according to claim 1, whereby the second receiving element comprises a receiving pocket that surrounds the wrapping element form-lockingly from all sides and fixates it.

7. Wrapping device according to claim 6, whereby the wrapping element can be inserted in axial direction of the receiving pocket's opening into the second receiving element.

8. Wrapping device according to claim 1, whereby the wrapping element has a flat shape with a rectangular profile and in each case rounded edges.

9. Wrapping device according to claim 1, whereby at least one of the receiving elements on one of its flat sides comprises a spring-loaded pressure piece for fixating, largely without play, the free end of the wrapping element being retained in the receiving element.

10. Wrapping device according to claim 9, whereby the pressure piece is clamped in between the flat side of the wrapping element and a cover plate that is detachably fixed to the receiving element.

* * * * *